(12) United States Patent
Ellis et al.

(10) Patent No.: US 6,195,662 B1
(45) Date of Patent: Feb. 27, 2001

(54) SYSTEM FOR TRANSFORMING AND EXCHANGING DATA BETWEEN DISTRIBUTED HETEROGENEOUS COMPUTER SYSTEMS

(75) Inventors: Darin Ellis, Orleans; Michael Doyle, Gloucester, both of (CA)

(73) Assignee: Juxtacomm Technologies Inc., Gloucester (CA)

( * ) Notice: Subject to any disclaimer, the term of this patent is extended or adjusted under 35 U.S.C. 154(b) by 0 days.

(21) Appl. No.: 09/105,299

(22) Filed: Jun. 26, 1998

Related U.S. Application Data

(60) Provisional application No. 60/051,052, filed on Jun. 27, 1997.

(51) Int. Cl.[7] .................................................. G06F 17/00
(52) U.S. Cl. ................................. 707/103; 707/1; 707/2; 707/8; 707/10; 707/102
(58) Field of Search ................................. 707/1–2, 8, 10, 707/102–103

(56) References Cited

U.S. PATENT DOCUMENTS

| | | | |
|---|---|---|---|
| 5,497,491 | * | 3/1996 | Mitchell et al. .......................... 707/1 |
| 5,729,733 | * | 3/1998 | Sharif-Askary ........................... 707/8 |
| 5,799,310 | * | 8/1998 | Anderson et al. .................... 707/100 |
| 5,970,490 | * | 10/1999 | Morgenstern ........................... 707/10 |
| 5,988,862 | * | 11/1999 | Kacyra et al. ............................. 705/5 |
| 6,047,291 | * | 4/2000 | Anderson et al. .................... 707/103 |
| 6,078,925 | * | 6/2000 | Anderson et al. ........................ 707/2 |

OTHER PUBLICATIONS

IEEE publication, "The HERMES Language for Work Session Specification" by Manolis Marazakis et al., Institute of Computer Science, FORTH, Greece, pp. 542–547, Aug. 1998.*

* cited by examiner

*Primary Examiner*—Thomas G. Black
*Assistant Examiner*—Diane D. Mizrahi
(74) *Attorney, Agent, or Firm*—Hardaway/Mann IP Group Nexsen Pruet Jacobs & Pollard, LLP

(57) ABSTRACT

A system and method is described for importing data from a source computer system, manipulating and transforming of that data, and exporting the data to a target computer system under control of a script processor using stored metadata definitions. Metadata is used to describe the properties of the data being manipulated. The system includes a means for manipulating the metadata definitions. The metadata definitions are created to import data into the system, export data from the system, create views of the external data, store generic format data within the system, manipulate generic format data within the system and to control data flow through the system. Data is imported into the system using an import data definition to map the external data into an import data bag. Data imported into an import data bag becomes independent of the original data source. Data is manipulated within the system using script control commands and data is transformed within the system using rule sets that act upon data bags. Data is exported from the system using an export data definition to map the import data bag into the required export data bag format and then to write data in the export data bag to the external data target.

19 Claims, 12 Drawing Sheets

```
IF IN.CITY = "OTTAWA"
    OUT.NAME = APPEND( IN.FIRST_NAME, " ", IN.LAST_NAME )
    OUT.ADDR = IN.ADDR
    OUT.CITY = IN.CITY
    OUT.AGE = IN.AGE
END IF
```

ODBC database : ADDRESS.MDB    101

| FIRST_NAME | LAST_NAME | ADDRESS | CITY | COUNTRY | AGE |
|---|---|---|---|---|---|
| Bob | Drake | 10 Penny St. | Toronto | CA | 29 |
| Susan | Hellman | 55 Birch Rd. | Ottawa | CA | 35 |
| John | Bull | 101 Pullman Ave. | New York | US | 23 |
| Josef | Karsch | 31 Rideau St. | Ottawa | CA | 85 |

FIGURE 10

Data Bag : MAILING_DBAG    111

DATA DEFINITION COLLECTION    112

| KEY | ITEM NAME | ITEM TYPE | PARENT | MAX. OCCURS | ITEM COUNTER | LEVEL |
|---|---|---|---|---|---|---|
| FIRST_NAME | FIRST_NAME | | | 1 | | 1 |
| LAST_NAME | LAST_NAME | | | 1 | | 1 |
| ADDRESS | ADDRESS | | | 1 | | 1 |
| CITY | CITY | | | 1 | | 1 |
| COUNTRY | PROV | | | 1 | | 1 |
| AGE | AGE | | | 1 | | 1 |

DATA GROUP COLLECTION    113

| KEY | VALUE | KEY | VALUE | KEY | VALUE | KEY | VALUE |
|---|---|---|---|---|---|---|---|
| FIRST_NAME | Bob | FIRST_NAME | Susan | FIRST_NAME | John | FIRST_NAME | Josef |
| LAST_NAME | Drake | LAST_NAME | Hellman | LAST_NAME | Bull | LAST_NAME | Karsch |
| ADDRESS | 10 Penny St. | ADDRESS | 55 Birch Rd. | ADDRESS | 101 Pullman Ave | ADDRESS | 31 Rideau St. |
| CITY | Toronto | CITY | Ottawa | CITY | New York | CITY | Ottawa |
| COUNTRY | CA | COUNTRY | CA | COUNTRY | US | COUNTRY | CA |
| AGE | 29 | AGE | 35 | AGE | 23 | AGE | 85 |

FIGURE 11

Data Bag : CITY_DBAG     121

DATA DEFINITION COLLECTION     122

| KEY | ITEM NAME | ITEM TYPE | PARENT | MAX. OCCURS | ITEM COUNTER | LEVEL |
|---|---|---|---|---|---|---|
| NAME | NAME | TEXT | | 1 | | 1 |
| ADDRESS | ADDRESS | TEXT | | 1 | | 1 |
| CITY | CITY | TEXT | | 1 | | 1 |
| AGE | AGE | INTEGER | | 1 | | 1 |

DATA GROUP COLLECTION     113

| KEY | VALUE | KEY | VALUE |
|---|---|---|---|
| FIRST_NAME | Susan | FIRST_NAME | Josef |
| LAST_NAME | Hellman | LAST_NAME | Karsch |
| ADDRESS | 55 Birch Rd. | ADDRESS | 31 Rideau St. |
| CITY | Ottawa | CITY | Ottawa |
| COUNTRY | CA | COUNTRY | CA |
| AGE | 35 | AGE | 85 |

FIGURE 12

Delimited Flat File : OTTAWA.CSV  131

| Susan Hellman,55 Birch Rd,Ottawa,35 |
| Josef Karsch,31 Rideau St,Ottawa,85 |

FIGURE 13

| | | | | | | | | | | | |
|---|---|---|---|---|---|---|---|---|---|---|---|
| FIRST_NAME | | | CHAR(30) | | | | | | | | |
| LAST_NAME | | | CHAR(30) | | | | | | | | |
| ADDR_LINE1 | | | CHAR(30) | | | | | | | | |
| ADDR_LINE2 | | | CHAR(30) | | | | | | | | |
| CITY | | | CHAR(30) | | | | | | | | |
| PROV | | | CHAR(30) | | | | | | | | |
| NBR_CHILDREN | | | INTEGER(3) | | | | | | | | |
| CHILDREN | | | OCCURS 1 TO 10 TIMES | | | | | | | | |
|     CHILD_NAME | | |     CHAR(30) | | | | | | | | |
|     CHILD_AGE | | |     INTEGER(3) | | | | | | | | |

FIGURE 14

Repeating Data File : REPEAT.TXT    151

| Henry | Smith | 61 Falldown Rd. | RR1 | Greely | Ont | 3 | Amy | 16 | John | 13 | Bob | 23 |
|---|---|---|---|---|---|---|---|---|---|---|---|---|
| John | Kierstead | 1034 Ayr Place | Apt. 132 | Ottawa | Ont | 1 | Susan | 10 | | | | |

FIGURE 15

Data Bag : REPEATING_DBAG    161

DATA DEFINITION COLLECTION    162

| KEY | ITEM NAME | ITEM TYPE | PARENT | MAX. OCCURS | ITEM COUNTER | LEVEL |
|---|---|---|---|---|---|---|
| FIRST_NAME | FIRST_NAME | TEXT | | 1 | | 1 |
| LAST_NAME | LAST_NAME | TEXT | | 1 | | 1 |
| ADDR_LINE1 | ADDR_LINE1 | TEXT | | 1 | | 1 |
| ADDR_LINE2 | ADDR_LINE2 | TEXT | | 1 | | 1 |
| CITY | CITY | TEXT | | 1 | | 1 |
| PROV | PROV | TEXT | | 1 | | 1 |
| NBR_CHILDREN | NBR_CHILDREN | INTEGER | | 1 | | 1 |
| CHILDREN | CHILDREN | GROUP | | 1 | | 1 |
| CHILDREN[*].CHILD_NAME | CHILD_NAME | TEXT | CHILDREN | 10 | NBR_CHILDREN | 2 |
| CHILDREN[*].CHILD_AGE | CHILD_AGE | INTEGER | CHILDREN | 10 | NBR_CHILDREN | 2 |

DATA GROUP COLLECTION    163

| FIRST_NAME | Henry | FIRST_NAME | John |
|---|---|---|---|
| LAST_NAME | Smith | LAST_NAME | Keirstead |
| ADDR_LINE1 | 61 Falldown Rd. | ADDR_LINE1 | 1034 Ayr Place |
| ADDR_LINE2 | RR1 | ADDR_LINE2 | Apt. 132 |
| CITY | Greely | CITY | Ottawa |
| PROV | Ont | PROV | Ont |
| NBR_CHILDREN | 3 | NBR_CHILDREN | 1 |
| CHILDREN[1].CHILD_NAME | Amy | CHILDREN[1].CHILD_NAME | Susan |
| CHILDREN[1].CHILD_AGE | 16 | CHILDRE[1].CHILD_AGE | 10 |
| CHILDREN[2].CHILD_NAME | John | | |
| CHILDREN[2].CHILD_AGE | 13 | | |
| CHILDREN[3].CHILD_NAME | Bob | | |
| CHILDREN[3].CHILD_AGE | 23 | | |

FIGURE 16

```
FOR CHILD_NDX = 1 TO NBR_CHILDREN
    IF CHILDREN[ CHILD_NDX ].CHILD_AGE < 20
        OUT.PARENT = APPEND( IN.FIRST_NAME, " ", IN.FIRST_NAME )
        OUT.CHILD_NAME = IN.CHILDREN[ CHILD_NDX ].CHILD_NAME
        OUT.CHILD_AGE = IN.CHILDREN[ CHILD_NDX ].CHILD_AGE
    END IF
END FOR
```

FIGURE 17

SYSTEM FOR TRANSFORMING AND EXCHANGING DATA BETWEEN DISTRIBUTED HETEROGENEOUS COMPUTER SYSTEMS

RELATED APPLICATIONS

This invention claims the benefit of priority under Title 35 USC §119(e) of provisional application for patent Ser. No. 60/051,052, filed Jun. 27, 1997.

FIELD OF THE INVENTION

This invention relates to a system and method for importing, transforming and exporting data between distributed heterogeneous computer systems and in particular to a system of script processing utilizing metadata to control data transformation within the system and data movement into and out of the system.

BACKGROUND OF THE INVENTION

Data exchange between distributed heterogeneous computer systems has been problematic in the industry. Businesses frequently use disparate data formats and data storage types within a corporate structure. As well, business partners almost invariably use different data formats. To permit data exchange when different formats are used, a static intercommunication facility must be maintained for each pair of disparate data formats and/or data storage types. Changes to data formats or data storage types force the re-engineering of the corresponding facility.

A data import/export system is taught in U.S. Pat. No. 5,497,491 which issued on Mar. 5, 1996 to Mitchell et al. That patent describes a system and method for importing and exporting data between an external object oriented computing environment. The system and method requires a datalist object for each field to be moved from the external object oriented computing environment to the external computing environment. A metadata object is required for each datalist object. The system is therefore complex and resource-use intensive. Furthermore, it is only capable of moving data from an object-oriented to some other computer environment. The system is therefore inflexible and unsuitable for use in many applications where import/export must be performed between two computer systems that do not use object oriented data formats.

Therefore, what is needed is a distributed system and method that is capable of transforming data from a source computer system into data usable by a computer system which stores data in a different format. This system must provide a simple means for specifying the transformation definitions and for controlling the flow of data from an input data source to an output data target. Configuration management of the system must be dynamic to respond to the changing business environment and non-intrusive to minimize the effects of changing data formats or data storage types.

SUMMARY OF THE INVENTION

It is therefore an object of this invention to provide a system and method for data transformation and data exchange between distributed heterogeneous computer systems.

It is another object of the present invention to provide a script processing language that defines operations to control data transformation within the system and data movement into and out of the distributed system, utilizing metadata definitions.

It is another object of the present invention to provide a format control language that defines the transformation of an external data source into data bags and of the internal data bags to an external data target.

It is another object of the present invention to provide a means of configuration management that allows a user of the system to define scripts, import data connections, export data connections, data bags, and rule set definitions and to store them in a metadata database.

It is another object of the present invention to provide a means of executing scripts in order to control the distributed transformation system.

According to the invention, there is provided a system for transforming and exchanging datastore data between heterogeneous computer systems using different datastore formats for storing similar information, the system comprising: means for transforming and processing import datastore data into generic format data according to predetermined import transformation rules and functions; means for converting the generic format data into export datastore data according to predetermined export transformation rules and functions; and interface to communications means for receiving the import datastore data and for transmitting the export datastore data.

A datastore refers to the storing of any type of data in a persistent storage system, such as on magnetic media like a disk drive. The types of data stored could include text or binary.

As will be shown below, the present invention can be used to create import data definitions, data bag storage, data bag transformation definitions or rule sets, export data definitions and scripts to control the usage of all those definitions in the process of transforming and exchanging data between dissimilar computer systems.

A generic format data bag contains both the data to be manipulated and the data structure definitions, in a generic format. The present invention will use the title 'data bag' to indicate a generic format data bag.

BRIEF DESCRIPTION OF THE DRAWINGS

FIG. 10 shows the internal storage of an example ODBC-enabled database table used in the data transformation defined in FIG. 7.

FIG. 11 shows the internal storage of the data bag used to store the imported data defined and used in the data transformation defined in FIG. 7.

FIG. 12 shows the internal storage of the data bag used to store the data for export that is defined and used in the data transformation defined in FIG. 7.

FIG. 13 shows the internal storage of the export data target used in the data transformation defined in FIG. 7.

FIG. 14 shows the data layout, such as might appear in a computer program, of a text file containing personal information records. There is a repeating group of information at the end of each record. This data layout example will be used to show how data bags can handle repeating groups of data.

FIG. 15 shows the text file, defined in FIG. 14, with some example data.

FIG. 16 shows a data bag containing the data from the text file defined in FIG. 15. The data group definition 162 shows how the 'CHILDREN' group is defined and the data group collection 163 shows how the 'CHILDREN' group is stored.

FIG. 17 shows an example rule that would act on the data bag defined in FIG. 16 and output only the personal records that contained children whose age is less than 20.

DETAILED DESCRIPTION OF THE INVENTION

Prior to describing a system and method for data transformation and data exchange between distributed heterogeneous computer systems according to the present invention, a general overview of the computing environment will be provided. A general description of the system and method of the present invention will then be provided, followed by a detailed design description for the system and method for data transformation and data exchange according to the present invention.

Figure 1:
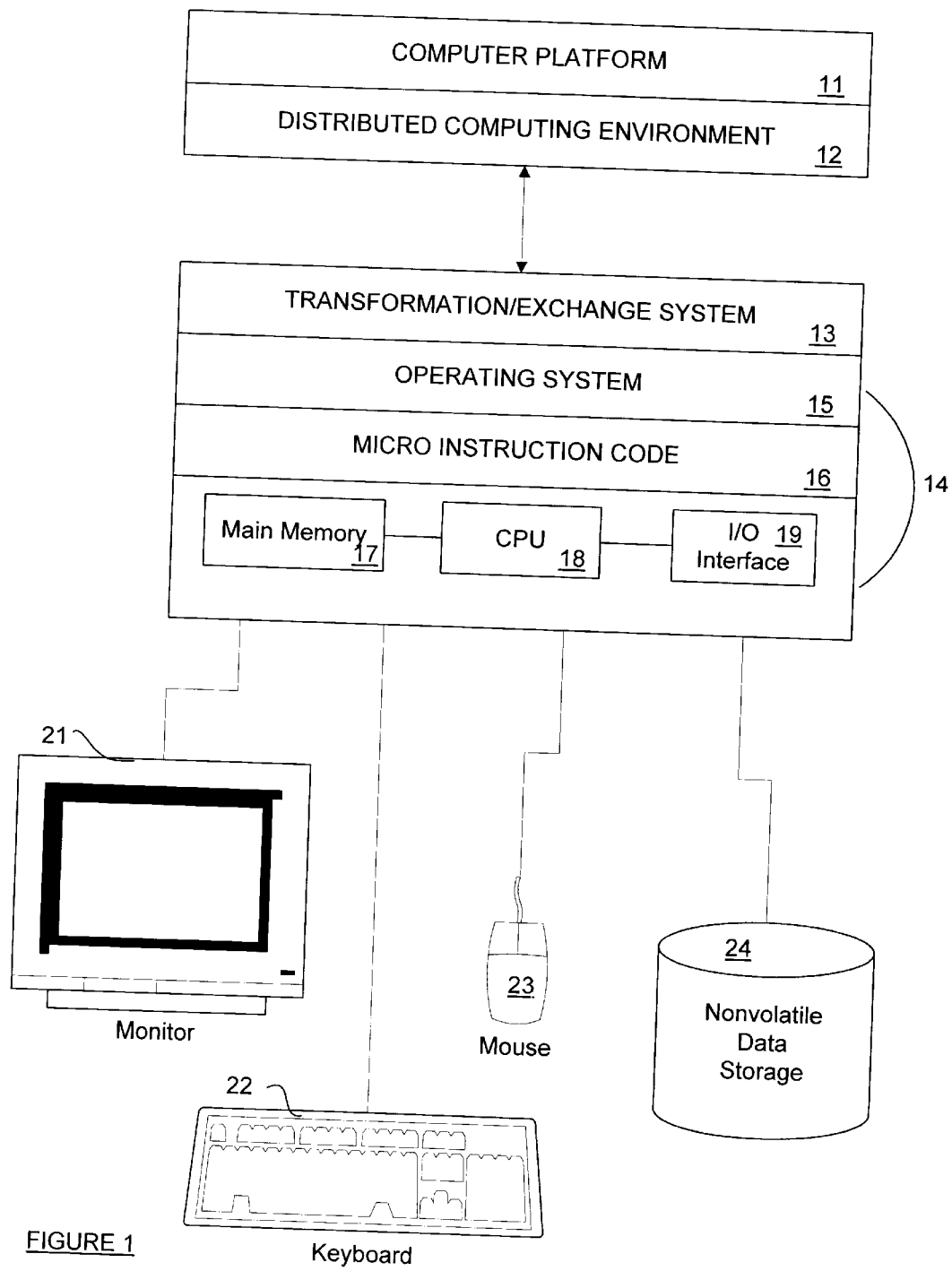
FIG. 1 shows a block diagram of a data transformation and exchange environment, an external distributed computing environment and the associated hardware platforms.
Figure 2:
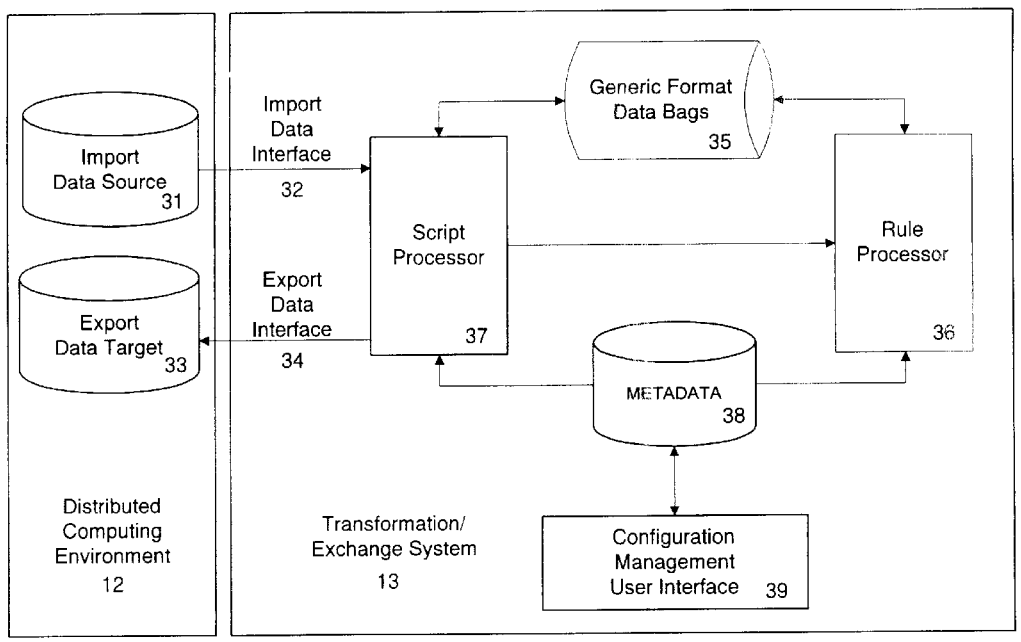
FIG. 2 shows a block diagram of a system for transforming and exchanging data between heterogeneous distributed computing environments according to the present invention.

Referring to FIG. 1 and FIG. 2, the hardware and software environment in which the present invention operates will now be described. The present invention is a method and system for data transformation and data exchange between an external distributed computing environment 12 operating on one or more computer platforms 11 and a transformation/exchange system 13 operating on one or more computer platforms 14. It will be understood by those having skill in the art that each of computer platforms 11 and 14 typically include computer hardware units such as main memory 17, a central processing unit (CPU) 18 and an input/output (I/O) interface 19, and may include peripheral components such as a display terminal 21, an input device such as a keyboard 22 or a mouse 23, nonvolatile data storage devices 24 such as magnetic or optical disks and other peripheral devices. Computer platform 11 or 14 also typically includes micro-instruction code 16, and an operating system 15. As one example, each computer platform 11 and 14 may be a desktop computer having an IBM PC architecture. Operating system 15 may be a Microsoft Windows NT operating system. FIG. 2 is a functional block diagram of the current invention. It will be understood by those having skill in the art that this architecture might be implemented on multiple machines and will vary according to the application.

Figure 4:
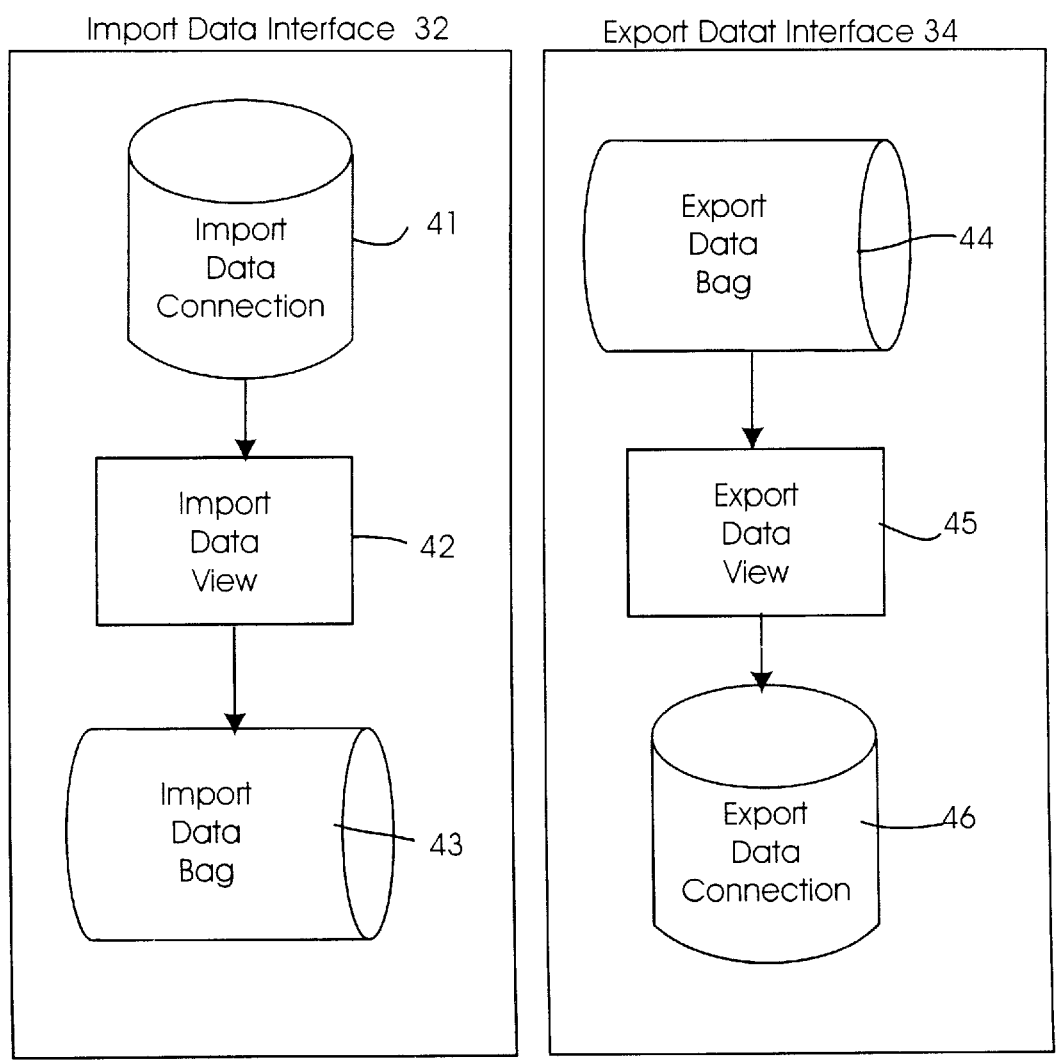
FIG. 4 shows the operations performed by the import data interface 32 and the export data interface 34 when the script processor 37 of FIG. 2 is invoked.

Referring to FIG. 1, a system 13 for transformation and exchange between distributed heterogeneous computer systems 12, according to the present invention, is shown. As shown in FIG. 2, the transformation and exchange system 13 includes an import data interface 32 to import data from an import data source 31 into the transformation and exchange system 13. As shown in FIG. 4, the import data interface 32 includes an import data connection 41, an import data view 42 of the import data source 31 and a generic format data bag 43 where the imported data is to be stored. Those skilled in the art will understand that a view is a logical subset of the content of an actual external data source. The import data view 42 is a logical subset of the content of the import data source 31. As will be shown below, the import data view 42 will be used during the execution of the script processor 37 (FIG. 2) to load data from the import data source 31 into the data bag 43.

Data bags 43 are used in the present invention for the storage and transformation of external data. A data bag contains both the definition of the data contained within the data bag and the actual generic format data. Generic format data refers to data that has been stored within the present invention and is now independent of the original data source. Data stored in this generic format can be transformed into any required format for exporting to an export data target 33 (FIG. 2). Data bags are stored in non-persistent storage, like main memory 17, are created by the script processor and exist while the script is running. Data bags can contain fixed format data, data grouping and repeating data groups.

Referring again to FIG. 2, the system includes an export data interface 34 to export a data bag 44 out to an export data target 33. As shown in FIG. 4, the export data interface 34 includes generic format data bag 44 where data for exporting is stored, the export data view 45 of the data bag 44 and the export data connection 46. As will be shown below, the export data view 45 of the data bag 44 will be used during the execution of the script processor 37 to save data from the data bag 44 out to the export data target 33.

Figure 3:
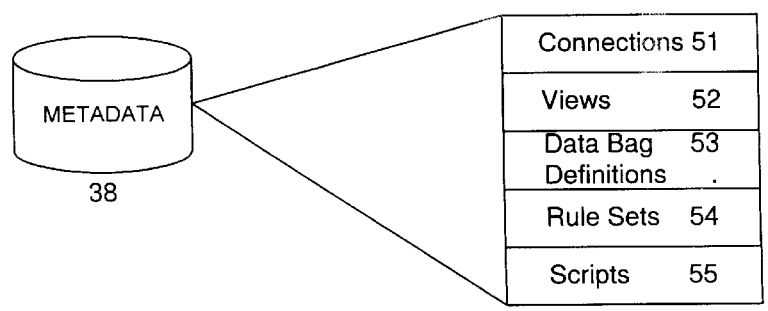
FIG. 3 shows the components of the present invention that are defined within the metadata database.

Also shown in FIG. 2 and FIG. 3, the system includes a configuration management user interface 39 to define the components of the present invention, which include external data connections 51, views 52, data bags 53, rule sets 54 and scripts 55. These component definitions are stored in the metadata database 38. The data bags are stored in the internal datastore 35. The component definitions will be described in detail below.

The transformation and exchange system 13 includes a script processor 37, in order to run scripts 55 defined in the metadata database 38. The script processor 37 identifies the script command and invokes the correct method for that script command. The transformation/exchange system 13 also contains a rule processor 36 that is invoked by the script processor 37 to transform one data bag into another data bag based on a rule. Rules will be described below.

Figure 5:
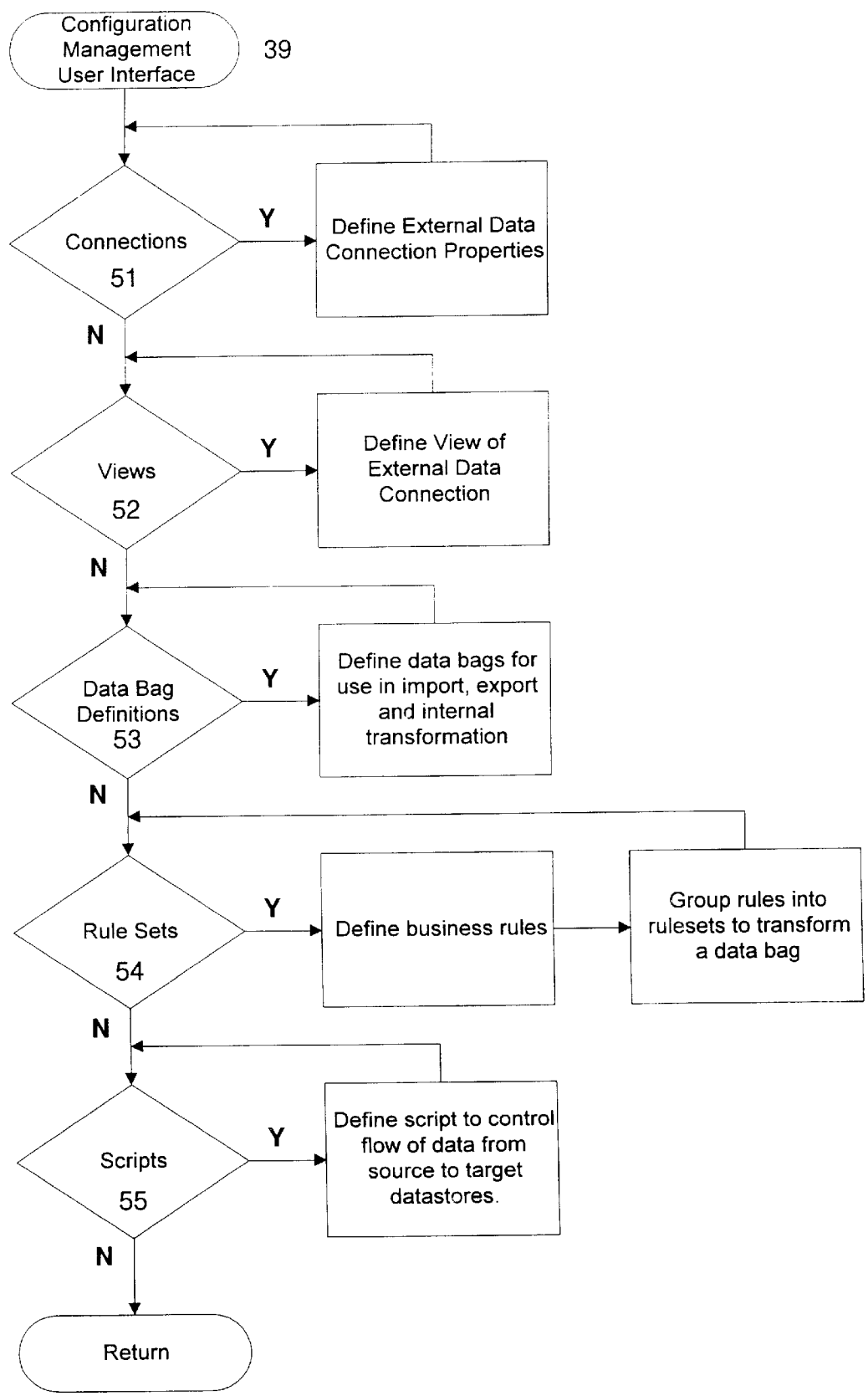
FIG. 5 is a flow diagram showing operations performed by the configuration management user interface 39 of FIG. 2 at program execution time.

FIG. 5 is a flow diagram showing the components that can be defined using the configuration management user interface 39 and the actions taken when defining each component.

Connections 51 must have their connection type and properties defined. The connection type will be any of the industry standard data storage types, such as ODBC-enabled databases, spreadsheets, message-oriented middleware and text files. The properties will include the name and location of the external data storage.

Views 52 must be associated with either an import data connection 41 (FIG. 4) or an export data connection 46. Each data connection has one or more views of the external data. These views are used to import different collections of data from an import data source 31 (FIG. 2), or to export different collections of data from an export data bag 44 out to an export data target 33.

Data bag definition 53 contain two types of data collection: a data definition collection and a data group collection.

A collection is a logical grouping of records that use the same format method. All the element definitions for a data bag are stored within the data definition collection. Each row of data in a data bag is stored as one data group in the data group collection. The data group collection contains all the data groups in the data bag. An import data connection 41 must have one or more import data views 42 and each data view must have an associated import data bag 43. Using the data definitions in the data definition collection 112 (FIG. 11) of a data bag, the import data view 42 of the import data connection 41 is loaded in the import data bag 43. An export data connection 46 must have one or more export data views 45 and each data view must have an associated export data bag 44. Using the data definitions in the data definition 112 of a data bag, the export data view 45 of the export data connection 46 is written using the data contained in the data bag. Data bags are also defined for use by script commands that require import and export data bag(s), where these commands transform the data from the import data bag 43 and place the results in the export data bag 44.

Rule sets 54 (FIG. 5) are collections of rules within the present invention. Rule sets are used to transform a data bag in one format into another data bag of a different format. The purpose of a rule is to perform a specific operation to achieve a desired result. A rule is one or more statements. These statements are executed from top to bottom and when the last statement within the rule has been executed, or an Exit statement is encountered, the rule ends.

A statement is a single line in a rule. The types of statements implemented by the present invention, within the rule set processor, includes comments, conditional processing, exiting a rule, looping, variable declaration and variable assignment.

Conditional processing, looping and assignment statements contain expressions. Elementary expressions include strings, numbers, content of a variable and return value of a function. Functions are categorized into character manipulation, string manipulation, including other rules, initialization information, external file manipulation, variable content reporting and user interface.

Complex expressions combine many elementary expressions in some manner, for the purpose of producing a single result. Complex expressions can be either arithmetic or conditional.

Complex arithmetic expressions are numeric elementary expressions that are combined to produce a single arithmetic result. Such expressions follow the standard format of all numeric expressions. Numbers are acted upon by numeric operators such as addition, subtraction, multiplication, division, modulo and exponential. Brackets are used to group numbers and operators which need to be evaluated together.

Conditional expressions return the value True or False. These types of expressions are used to control conditional processing within the rules. Brackets are used to group conditions which need to be evaluated together. Complex conditional expressions are formed by combining simple conditions with 'And' or 'Or' operators.

Simple conditions have a 'left side' 'operator' 'right side' format. The left and right sides are elementary expressions. The logical operators that can be used for these conditions are equals, greater, less, not equal, greater or equal, less or equal, 'like' and 'in'. A simple condition can be negated by using the word 'not' in front of the condition.

Scripts 55 must be defined to control data movement into and out of the system, and to control data transformation within the system.

Figure 6:
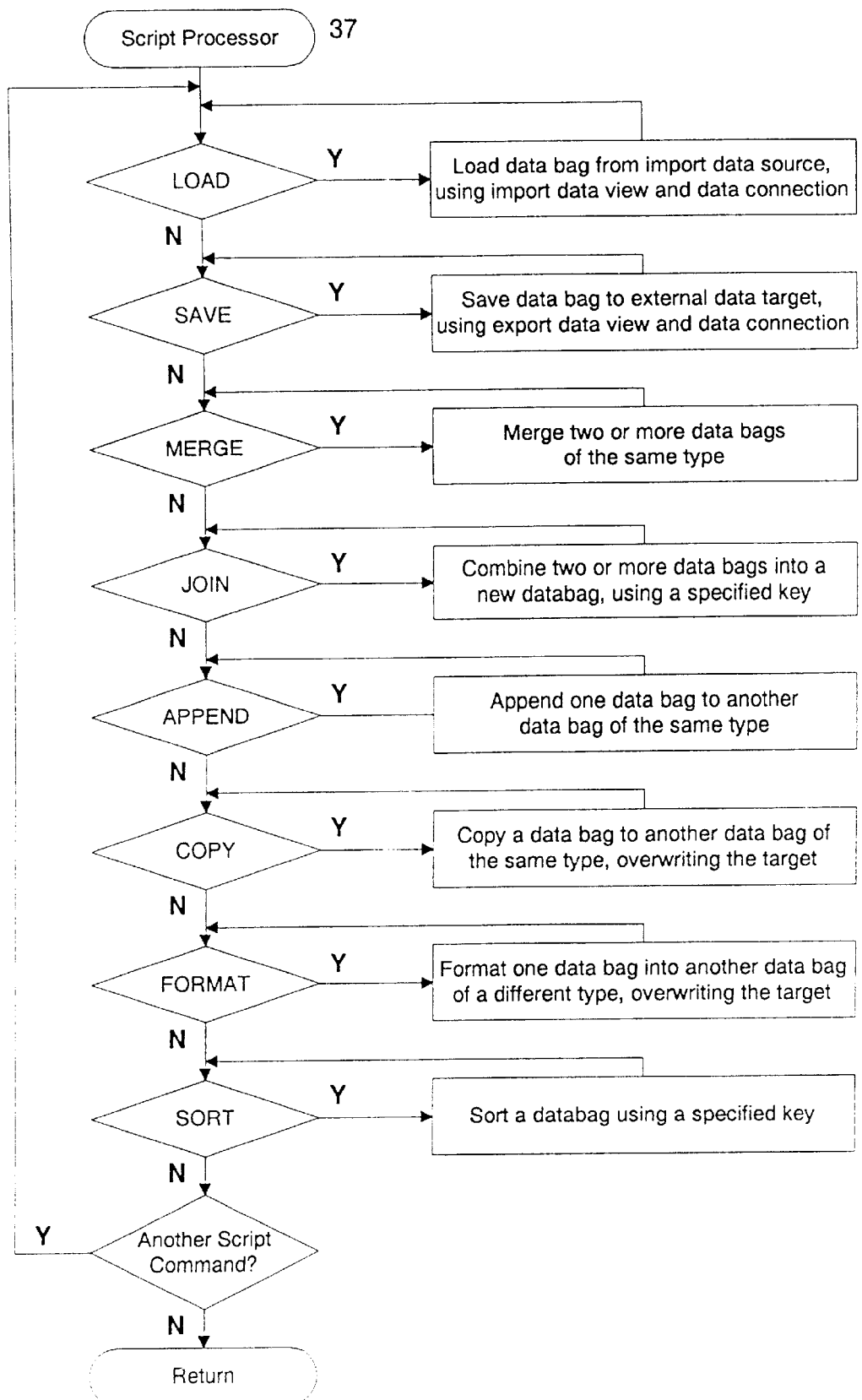
FIG. 6 is a flow diagram showing operations performed by the script processor 37 of FIG. 2.

FIG. 6 is a flow diagram showing the actions taken by the script processor 37 of the present invention.

The LOAD command permits an import data view 42 to be used to load data from an import data source 31 into an import data bag 43. The import data view 42 is associated with an import data connection 41, which specifies the import data source 31.

The SAVE command permits an export data view 45 to be used to save data from an export data bag 44 out to an external data target 33. The export data view 45 is associated with an export data connection 46, which specifies the external data target 33.

The MERGE command permits two or more specified data bags, of the same data bag type, to be merged into another data bag. Only non-duplicate data groups from the input data bags are merged into the output data bag.

The JOIN command permits two or more specified data bags to be joined together into another data bag, dependent on the matching of a specific key value.

The APPEND command permits one data bag to be appended to the end of another data bag of the same data bag type.

The COPY command permits one data bag to be copied to another specified data bag of the same data bag type. If the target data bag exists, it will be overwritten.

The FORMAT command permits the transformation of a specified data bag into another data bag, possibly of a different data bag type, using a specified rule. This command will invoke the rule processor 36 to take the input data bag, transform the data according to the rule statements and populate the output data bag with the transformed data.

The SORT command permits a data bag to be sorted by one or more data elements within the data bag. Each element can have an ascending or descending sort applied to it. The result can be placed back into the original data bag or the result can be written to another data bag of the same type.

An example of a transformation according to a preferred embodiment of the invention will be shown in the following description. The embodiment will describe the definition and usage of an import data connection, export data connection and transformation requirements to convert an Open Database Connectivity (ODBC) enabled database table into a delimited flat file. This example was chosen because of the widespread usage of both ODBC and delimited files in the business community and of the direct application of the invention to the problem of transforming data between these two standards used by heterogeneous computer systems.

Figure 7:
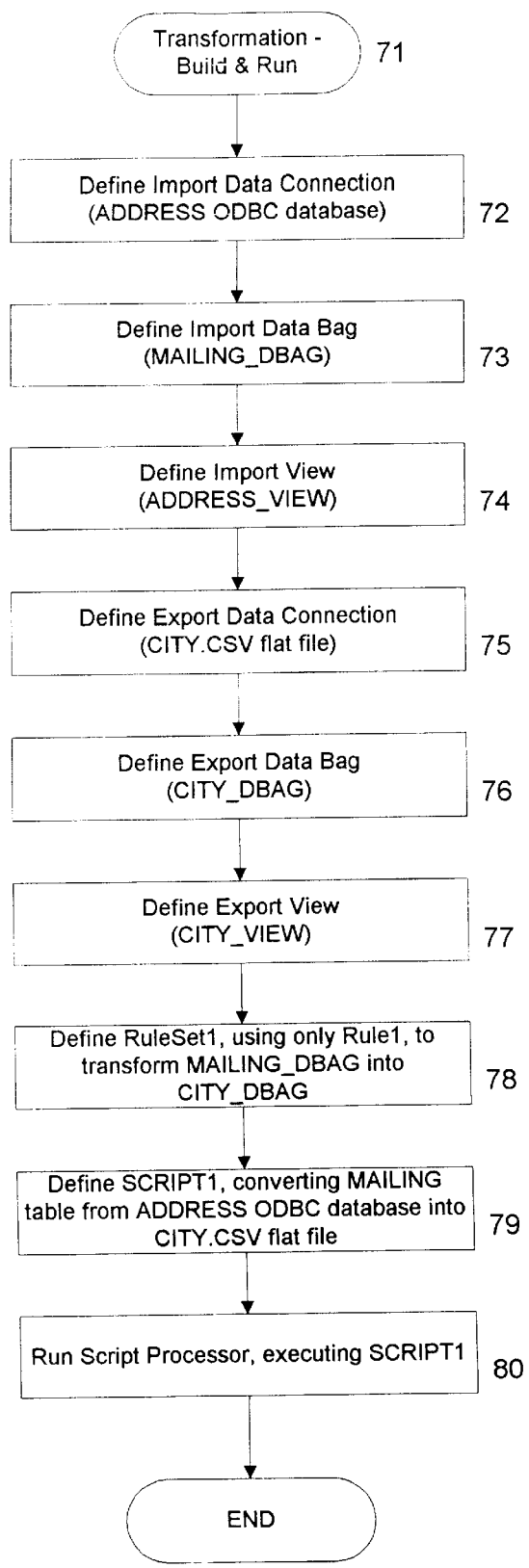
FIG. 7 shows an example of the operations to define the components for a data transformation.

FIG. 7 shows the steps taken by the user to set up the definitions required for the preferred embodiment and to initiate the script to carry out the transformation from ODBC database data to delimited data. The user will invoke the configuration management user interface 39 (FIG. 2) to create the required definitions.

As shown in step 72, the user defines the import data connection 41 with a connection type of ODBC-enabled database, defines the location of the import data source 31 and defines the table within the database to be used as the data source. In step 73 the user defines the import data bag to hold the data imported from the import data connection 41. In step 74 the import data view 42 is created to define the fields within the import database table that are to be used when processing the data source. The import data view 42 is associated with the import data bag 43 that will receive the incoming data.

In step 75, the export data connection 46 is defined with a connection type as file and the location of the target data file is defined. In step 76, the user defines the export data bag that will hold the data to be used by the export data connection 46. In step 77 the export data view 45 is created to define the layout of the target data file. The export data view 45 is associated with the export data bag 44 that will be used to send data to the external data target 33.

In step 78, the rule definition allows the user to specify a complex set of statements to control the transformation of one data bag to another data bag. The statements in the rule come from the format control language which includes conditional logic flow control, looping and the ability to define and call functions not defined within the language.

In step 79, the user then defines the script that will load the import data source 31 into an import data bag 43, transform the loaded import data bag 43 into an export data bag 44 by executing the rule processor 36 using the specified rule (Rule1), and then exports the export data bag 44 to the external data target 33.

Finally, in step 80, the user initiates the script processor 37 to execute the script. The script processor 37 can be initiated from the graphical interface or from an interface external to the system.

Figures 8, 9:
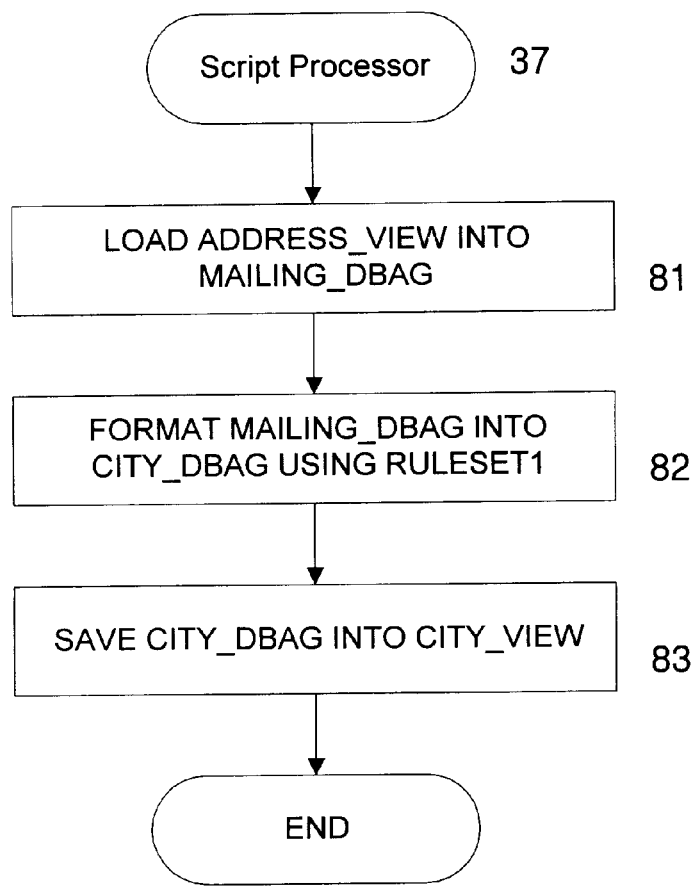
FIG. 8 shows an example script to control the data transformation defined in FIG. 7.
FIG. 9 shows an example of part of a rule that could be used in the data transformation defined in FIG. 7.

FIG. 8 shows the script defined for this example. The first script command 81 uses the import data connection 41 and import data view 42 to load the data from the import data source 31 into the import data bag 43. The second command 82 transforms the data bag 43 into an export data bag 44 using the specified rule set (RuleSet1). Once the export data bag 44 has been populated with the transformed data it can be saved 83 directly out to the export data target 33, using the export data view 45 and the export data connection 46.

FIG. 9 shows an example rule for this example. The example rule demonstrates the use of conditional flow control (IF statement), record selection based on incoming data content (IN.CITY="OTTAWA") and data transformation using assignment statements (for example, OUT.NAME=APPEND(IN.FIRST_NAME, "", IN.LAST_NAME)). In step 78 of FIG. 7, RuleSet1 is defined to contain one rule (Rule1) which transforms data bag MAILING_DBAG into data bag CITY_DBAG. When Rule1 is executed in the example shown in FIG. 9, the import data bag refers to MAILING_DBAG and the export data bag refers to CITY_DBAG.

FIG. 10 shows an example import data source 31 for this example. The internal storage of an ODBC-enabled database table is shown. The data in this table will be used to illustrate the data transformation defined in FIG. 7. The import data connection 41, defined in step 72, refers to the exact location of the database file ADDRESS.MDB 101 and indicates that the database is ODBC-enabled. The import data view 42, defined in step 74, specifies that all the fields in the data source table will be imported into the import data bag 43, defined in step 73.

FIG. 11 shows the internal storage of the import data bag 43, defined in step 73, which is used in the data transformation in FIG. 7. The data definition collection 112 specifies the key name used for locating fields in the data group collection 113 and specifies the data type for a field value associated with each key. All the fields in the data source table have been imported into the MAILING_DBAG data bag 111. This import data bag is created by the LOAD script command in step 81, (FIG. 8) using metadata definitions from the metadata database 38.

FIG. 12 shows the internal storage of the export data bag 44, defined in step 76, which is used in the data transformation described with reference to FIG. 7. The data group definition 122 is different than the data group definition 112 shown in FIG. 11. The CITY_DBAG data bag 121 contains three of the original six fields from the MAILING_DBAG, the import 111 data bag, as well as a computed field that is a concatenation of the first and last names from the import data bag. The CITY_DBAG 12 export data bag is created by FORMAT script command in step 82, using metadata definitions from the metadata database 38 (FIG. 2). FIG. 9 shows part of Rule1, which is contained in RuleSet1 and defined in step 78. The rule set in this example filters out all data group collection records in the MAILING_DBAG import data bag that have a city name of 'OTTAWA' and then writes those records into the CITY_DBAG export data bag.

FIG. 13 shows the internal storage of the export data target 33 for this example. The internal storage of a delimited flat file is shown. The export data connection 46, defined in block 75, refers to the exact location of the flat file CITY.CSV and indicates that the file is delimited. The export data view 45, defined in step 77, specifies that all the fields in the data bag will be exported to the delimited flat file 131, defined in step 73. The CITY.CSV flat file is created by the SAVE script command in step 83, using metadata definitions from the metadata database 38.

FIG. 14 shows a second import data example. The storage format of a personal information text file is shown. Each record contains a group at the end of the record, with repeating information about children of the specified person. This file definition will be used to illustrate the data storage of repeating group information in a data bag and the rule processing of the repeating group information during a data bag transformation. This file definition will be used to create the import data interface 32 used in this example.

FIG. 15 shows the internal storage of the text file defined in FIG. 14. Each record contains a common set of fields before the 'CHILDREN' group. At the end of each record the 'CHILDREN' group may contain from zero to ten sets of 'child' information, consisting of the child's name and age. Each record is terminated by an end-of-record indicator appropriate to the computer system on which the file resides.

FIG. 16 shows the internal storage of the import data bag 43, that contains the imported data of the text file shown in FIG. 15. The data definition collection 162 now shows an example of a 'group' item type. The 'CHILDREN' group is defined as containing two fields, as specified by the two entries following the 'CHILDREN' group entry. The data group collection 163 shows how each record from the import text file, shown in FIG. 15, is stored. The number of occurrences of the data group, defined by 'NBR_CHILDREN', must be stored so that the correct number of sets of the 'CHILDREN' group can be processed when manipulating the import data bag.

FIG. 17 shows an example rule created to transform the REPEATING_DBAG import data bag defined in FIG. 16. This rule is one rule of a rule set. The rule will output the parent name, child name and child age for each input child whose age is less than 20. This example shows how a repeating information group can be manipulated within a data bag.

In the drawings and specification, there have been disclosed typical examples of the use of a preferred embodiment of the invention. Although specific terms have been employed to describe the preferred embodiment, they are used in a generic and descriptive manner only and not for purposes of limitation. The scope of the invention is set forth in the following claims.

We claim:

1. A distribution system for transforming and exchanging data between heterogeneous computer systems, comprising:
   a) a systems interface for defining logical import and export data interfaces, data transformation rule sets and scripts;
   b) a metadata database for storing said logical import and export data interfaces, data transformation rule sets and scripts;
   c) a script processor for utilizing metadata from the metadata database to control data transformation within said systems interface and movement of said data into and out of said distribution system; and
   d) a rule set processor responsive to said script processor for manipulating a data bag for storing imported data and a data bag for storing export data.

2. A distribution system as claimed in claim 1, wherein said systems interface comprises a configuration management user interface used by a user to define said logical import and export data interfaces, and create data transformation rule sets and scripts.

3. A distribution system as claimed in claim 2, wherein said logical import and export data interfaces comprise import and export data connections, import and export data views and said import and export data bags.

4. A distribution system as claimed in claim 3, wherein said logical import data interface is used to import data from an import data source into said distribution system.

5. A distribution system as claimed in claim 4, wherein said import data view is used during execution of said script processor to load data from said import data source into said import data bag.

6. A distribution system as claimed in claim 3, wherein said logical export data interface is used to export data in said data bag out to an export data target.

7. A distribution system as claimed in claim 6, wherein export data view of said export data bag is used during execution of said script processor to save data from said export data bag out to said export data target.

8. A distribution system as claimed in claim 1, wherein defined scripts stored in said metadata database are executed by said script processor.

9. A distribution system as claimed in claim 1, wherein said rule processor is invoked by said script processor to transform the import data bag into the export data bag based on predefined data transformation rules.

10. A distribution system as claimed in claim 1 wherein said script processor makes use of a script control language for controlling data transformation within said system interface and movement of said data into and out of said distribution system.

11. A distribution system as claimed in claim 10, wherein said script control language comprises a set of script commands and a script command processor to process and execute each of a number of script command lines.

12. A distribution system as claimed in claim 11, wherein said set of script commands comprises a load command to load data into an import data bag from an import data connection; a sort command for sorting data in a data bag into a different order; a merge command for merging together data in a number of data bags; an append command for appending data from one data bag into another data bag; a copy command for copying one data bag into another data bag; a join command for joining two or more data bags into another data bag; a format command for formatting a data bag into another data bag using a defined rule set; and a save command for saving data from an export data bag out to an export data connection.

13. In a distribution system for transforming and exchanging data between heterogeneous computer systems, a method of controlling data transformation within said distribution system, comprising the steps of:
   a) operating a script processor that utilizes metadata stored in a metadata database to control the loading of data into an import data bag from a logical import data interface and performing any one or more of the following steps to convert the data to a desired format in an export data bag;
      1) sorting said data according to a predetermined order;
      2) merging data from a number of data bags into one data bag;
      3) appending data from a first data bag into another data bag of the same type;
      4) copying data from a first data bag into another data bag of the same type;
      5) joining data from two or more data bags into another data bag using a specified key;
      6) formatting data from a data bag into another data bag of a different type, using a defined rule set; and
   b) saving the data in the export data bag out to an export data connection.

14. A method as claimed in claim 13 wherein said logical import data interface comprises import data connections, import data views and said import data bag.

15. A method as claimed in claim 14 wherein said logical import data interface is used to import data from an import data source into said distribution system.

16. A method as claimed in claim 15 wherein said import data view is used during execution of a script processor to load data from said import data source into said import data bag.

17. A computer readable memory for transforming and exchanging datastore data between heterogeneous computer systems using different datastore formats for storing similar information, comprising:
   a) executable code for providing a systems interface for defining logical import and export data interfaces, data transformation rule sets and scripts;
   b) executable code for providing a script processor for utilizing metadata from a metadata database to control data transformation within said systems interface and movement of said data into and out of said distribution system; and
   c) executable code for providing a rule set processor responsive to said script processor for manipulating a data bag for storing imported data and a data bag for storing export data.

18. A computer readable memory as claimed in claim 17 wherein the metadata database stores logical import and export data interfaces, data transformation rule sets and scripts executed by the script processor.

19. A computer readable memory as claimed in claim 17 further comprising a script control language used by the script processor to control data transformation within said system interface and movement of said data into and out of said distribution system.

* * * * *

UNITED STATES PATENT AND TRADEMARK OFFICE
CERTIFICATE OF CORRECTION

PATENT NO.         : 6,195,662 C1
APPLICATION NO.    : 90/010526
DATED              : July 27, 2010
INVENTOR(S)        : Darin Ellis et al.

Page 1 of 1

It is certified that error appears in the above-identified patent and that said Letters Patent is hereby corrected as shown below:

On the Title page,
Item (73) Assignee:, change "Shopplex.com Corporation, Calgary (CA)" to --Juxtacomm Technologies Inc., Calgary (CA)--

Signed and Sealed this
Nineteenth Day of April, 2011

David J. Kappos
*Director of the United States Patent and Trademark Office*

(12) EX PARTE REEXAMINATION CERTIFICATE (7638th)
United States Patent
Ellis et al.

(10) Number: US 6,195,662 C1
(45) Certificate Issued: Jul. 27, 2010

(54) SYSTEM FOR TRANSFORMING AND EXCHANGING DATA BETWEEN DISTRIBUTED HETEROGENEOUS COMPUTER SYSTEMS

(75) Inventors: Darin Ellis, Orleans (CA); Michael Doyle, Gloucester (CA)

(73) Assignee: Shopplex.com Corporation, Calgary (CA)

Reexamination Request:
No. 90/010,526, May 5, 2009

Reexamination Certificate for:
Patent No.: 6,195,662
Issued: Feb. 27, 2001
Appl. No.: 09/105,299
Filed: Jun. 26, 1998

Related U.S. Application Data

(60) Provisional application No. 60/051,052, filed on Jun. 27, 1997.

(51) Int. Cl.
*G06F 17/22* (2006.01)

(52) U.S. Cl. .................................. 707/999.103
(58) Field of Classification Search .................. None
See application file for complete search history.

(56) References Cited

U.S. PATENT DOCUMENTS

| | | |
|---|---|---|
| 4,485,439 A | 11/1984 | Rothstein |
| 4,631,666 A | 12/1986 | Harris et al. |
| 4,680,705 A | 7/1987 | Shu |
| 4,688,170 A | 8/1987 | Waite et al. |
| 4,714,995 A | 12/1987 | Materna |
| 4,751,635 A | 6/1988 | Kret |
| 4,751,740 A | 6/1988 | Wright |
| 4,791,558 A | 12/1988 | Chaitin et al. |
| 4,811,400 A | 3/1989 | Fisher |
| 4,815,030 A | 3/1989 | Cross |
| 4,908,759 A | 3/1990 | Alexander |
| 4,914,583 A | 4/1990 | Weisshaar et al. |
| 4,975,830 A | 12/1990 | Gerpheide et al. |
| 4,992,972 A | 2/1991 | Brooks |

(Continued)

FOREIGN PATENT DOCUMENTS

| | | |
|---|---|---|
| EP | 0 449 494 A3 | 8/1999 |
| WO | WO 94/20915 | 9/1994 |

OTHER PUBLICATIONS

Book—Lora D. Delwiche and Susan J. Slaughter, The Little SAS Book—A Primer, 244 Pgs.; 1995.

Microsoft Access User's Guide—Microsoft Corporation Version 2.0, Mar. 28, 1994.

Microsoft Language Reference—Microsoft Corporation Version 2.0, Mar. 28, 1994.

(Continued)

*Primary Examiner*—Deandra M Hughes

(57) ABSTRACT

A system and method is described for importing data from a source computer system, manipulating and transforming of that data, and exporting the data to a target computer system under control of a script processor using stored metadata definitions. Metadata is used to describe the properties of the data being manipulated. The system includes a means for manipulating the metadata definitions. The metadata definitions are created to import data into the system, export data from the system, create views of the external data, store generic format data within the system, manipulate generic format data within the system and to control data flow through the system. Data is imported into the system using an import data definition to map the external data into an import data bag. Data imported into an import data bag becomes independent of the original data source. Data is manipulated within the system using script control commands and data is transformed within the system using rule sets that act upon data bags. Data is exported from the system using an export data definition to map the import data bag into required export data bag format and then to write data in the export data bag to the external data target.

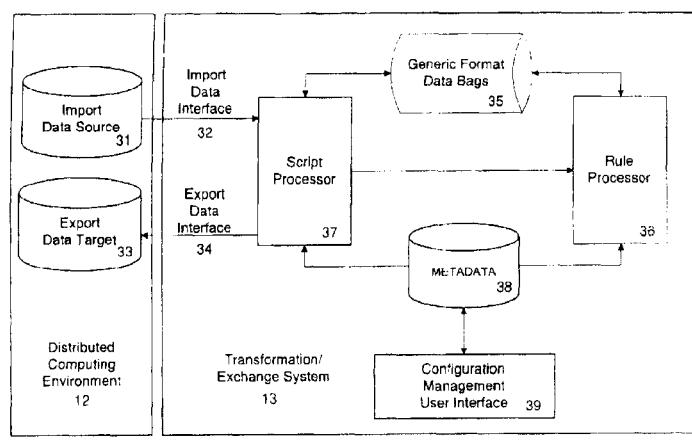

U.S. PATENT DOCUMENTS

| | | |
|---|---|---|
| 4,994,998 A | 2/1991 | Anezaki |
| 4,999,771 A | 3/1991 | Ralph et al. |
| 5,058,000 A | 10/1991 | Cox et al. |
| 5,060,140 A | 10/1991 | Brown et al. |
| 5,073,852 A | 12/1991 | Siegel et al. |
| 5,117,495 A | 5/1992 | Liu |
| 5,119,465 A | 6/1992 | Jack |
| 5,187,787 A | 2/1993 | Skeen et al. |
| 5,202,977 A | 4/1993 | Pasetes, Jr. et al. |
| 5,212,792 A | 5/1993 | Gerety et al. |
| 5,226,161 A | 7/1993 | Khoyi et al. |
| 5,257,366 A | 10/1993 | Adair |
| 5,257,369 A | 10/1993 | Skeen |
| 5,261,080 A | 11/1993 | Khoyi et al. |
| 5,278,978 A | 1/1994 | Demers |
| 5,339,434 A | 8/1994 | Rusis |
| 5,345,586 A | 9/1994 | Hamala |
| 5,367,698 A | 11/1994 | Webber et al. |
| 5,396,600 A | 3/1995 | Thompson et al. |
| 5,410,675 A | 4/1995 | Shreve et al. |
| 5,416,917 A | 5/1995 | Adair |
| 5,428,606 A | 6/1995 | Moskowitz |
| 5,490,134 A | 2/1996 | Fernandez et al. |
| 5,493,671 A | 2/1996 | Pitt |
| 5,497,491 A | 3/1996 | Mitchell et al. |
| 5,539,735 A | 7/1996 | Moskowitz |
| 5,557,798 A | 9/1996 | Skeen et al. |
| 5,566,332 A | 10/1996 | Adair |
| 5,579,521 A | 11/1996 | Shearer et al. |
| 5,586,330 A | 12/1996 | Knudsen |
| 5,596,744 A | 1/1997 | Dao et al. |
| 5,596,752 A | 1/1997 | Knudsen |
| 5,627,979 A | 5/1997 | Chang et al. |
| 5,652,874 A | 7/1997 | Upson et al. |
| 5,682,535 A | 10/1997 | Knudsen |
| 5,694,578 A | 12/1997 | Upson et al. |
| 5,708,828 A | 1/1998 | Coleman |
| 5,729,733 A | 3/1998 | Sharif-Askary |
| 5,781,911 A | 7/1998 | Young |
| 5,794,246 A | 8/1998 | Sankaran et al. |
| 5,799,310 A | 8/1998 | Anderson |
| 5,802,511 A | 9/1998 | Kouchi et al. |
| 5,806,066 A | 9/1998 | Golshani |
| 5,832,262 A | 11/1998 | Johnson et al. |
| 5,842,205 A | 11/1998 | Brann |
| 5,845,283 A | 12/1998 | Williams |
| 5,848,415 A | 12/1998 | Guck |
| 5,870,627 A | 2/1999 | O'Toole et al. |
| 5,884,310 A | 3/1999 | Brichta et al. |
| 5,893,911 A | 4/1999 | Piskiel |
| 5,909,570 A | 6/1999 | Webber |
| 5,911,074 A | 6/1999 | Leprince |
| 5,913,061 A | 6/1999 | Gupta et al. |
| 5,916,307 A | 6/1999 | Piskiel |
| 5,920,858 A | 7/1999 | Kitabayashi |
| 5,920,861 A | 7/1999 | Hall |
| 5,930,794 A | 7/1999 | Linenbach et al. |
| 5,970,490 A | 10/1999 | Morgenstern |
| 6,014,670 A | 1/2000 | Zamanian |
| 6,032,158 A | 2/2000 | Mukhopadhyay et al. |
| 6,038,558 A | 3/2000 | Powers et al. |
| 6,044,374 A | 3/2000 | Nesamoney |
| 6,047,291 A | 4/2000 | Anderson |
| 6,078,925 A | 6/2000 | Anderson |
| 6,101,556 A | 8/2000 | Piskiel et al. |
| 6,208,990 B1 | 3/2001 | Suresh et al. |
| 6,310,888 B1 | 10/2001 | Hamlin |
| 6,317,737 B1 | 11/2001 | Gorelik et al. |
| 6,339,775 B1 | 1/2002 | Zamanian et al. |
| 6,523,172 B1 | 2/2003 | Martinez-Guerra |
| 6,704,785 B1 | 3/2004 | Koo |

OTHER PUBLICATIONS

Microsoft ODBC 2.0 Programmer's Reference and SDK Guide, Mar. 28, 1994.

Microsoft Building Applications—Microsoft Corporation Version 2.0, Mar. 28, 1994.

Adali, et al, A Uniform Framework for Integrating Knowledge in Heterogeneous Knowledge Systems (Proceedings of the Eleventh Intl. Conference on Data Engineering), Mar. 1995.

Subrahmanian, et al, "Amalgamating Knowledge Bases", ACM Transactions on Database Systems, vol. 19, No. 2, Jun. 1994, pp. 291–331.

Brackett, "The Data Warehouse Challenge: Taming Data Chaos", Wiley Computer Publishing, 1996.

Goh, et al, "Context Interchange: Overcoming the Challenges of Large–Scale Interoperable Database Systems in a Dynamic Environment", ACM, 1994.

Daruwala, et al, "The Context Interchange Network Prototype", Database Applications Semantics, Prcdgs. of the IFIP WG 2.6 Working Conf. on Dtbs App. Semantics, May 30, 1995.

Siegel, et al, "Context Interchange in Client–Server Architecture", J. Systems Software, 1994; 27:223–232.

Madnick, S., "VLDB to VMLDB (Very Many Large Data Bases): Dealing with Large–Scale Semantic Heterogeneity", Prcds. of the 21st VLDB Conference, Zurich, Switzerland 1995.

IBM DataJoiner for AIX—Application Programming and SQL Reference Supplement, Version 1, First Edition, Sep. 1995.

IBM Data Propagator NonRelational MVS/ESA Administrators' Guide, Release 2.2 Second Edition (Feb. 1997).

Data Where You Need It, The DPropR Way! Data Propagator Relational Solutions Guide (Jun. 1995), IBM International Technical Support Organization, San Jose Center.

IBM DataRefresher, MVS and VM User's Guide, Version 1, First Edition, Oct. 1994.

IBM DataRefresher, An Introduction, Version 1, First Edition, Oct. 1994.

IBM DataRefresher, Exit Routines, Version 1, First Edition, Oct. 1994.

"DataMirror/400: Data Where It's Needed", Open the Door to Your AS/400 Data, date unknown.

DCLE Command Reference Guide, Release 2.1, Reliant Data Systems, 1997.

Donovan, R., "Data Replication: A New Alternative for High Performance Distributed Systems", Data Management Review, Mar. 1996.

EDA/SQL Data Administration Guide, Enterprise Data Access/SQL, Information Builders, 1995.

Focus Six for Windows Data Access & Communications, Information Builders, 1996.

Focus Six for Windows Developing Applications, Information Builders, 1996.

Focus Six for Windows Language Reference Manual, Information Builders, 1996.

Information Junction v. 1.7.3 Job Scheduler, Constellar Corporation, 1995.

Mamrak, et al, "Benefits of Automating Data Translation", IEEE Software, Jul. 1993.

Mercator—the New World of Data Mapping, TSI International, 1995.

Mercator for Web Servers "Why Mercator for Web Servers?", TSI International, Oct. 1996.

Mercator Reference and User Guide—First Edition, TSI International Software Ltd., Nov. 1993.

Mercator Reference and User Guide—Pre–Release 1.00.17, TSI International, PC Division, Jul. 1993.

Advanced Transformers User's Guide: Release 2.0 of the Data Interpretation System, Metaphor, Jun. 1994.

Capsule User's Guide: Release 2.0 of the Data Interpretation System, Metaphor, Jun. 1994.

Using NEONet Release 2.2, New Era of networks, Inc., Jul. 12, 1996.

"New Era of Networks Announces NEONet Version 2.2; Company Delivers Enterprise Software Product for Application Integration", Business Wire, Jul. 15, 1996.

Oracle7 Server Administrator's Guide, Release 7.3, Oracle, Feb. 1996.

Oracle7 Server Application Developer's Guide, Release 7.3, Oracle, Feb. 1996.

Oracle7 Server SQL Reference, Release 7.3, Oracle, Feb. 1996.

Oracle7 Server Messages, Release 7.3, Oracle, Feb. 1996.

Oracle7 Server Migration, Release 7.3, Oracle, Feb. 1996.

Oracle7 Server Utilities, Release 7.3, Oracle, Feb. 1996.

PL/SQL User's Guide and Reference, Release 2.3, Oracle, 1988.

Oracle7 Server Distributed Systems, vol. I: Distributed Data, Release 7.3, Oracle, Feb. 1996.

Oracle7 Server Distributed Systems, vol. II: Replicated Data, Release 7.3, Oracle, Feb. 1996.

Programmer's Guide to the Oracle Call Interface, Release 7.3, Oracle, Feb. 1996.

Programmer's Guide to the Oracle Pro*C/C++ Precompiler, Release 2.2, Oracle, Feb. 1996.

Oracle7 Server Reference, Release 7.3, Oracle, Jan. 1996.

Oracle Names Administrator's Guide, Release 2.0, Oracle, 1994.

Oracle Network Products Troubleshooting Guide, Release 2.3, Oracle, 1992.

Oracle7 Parallel Server Concepts and Administration, Release 7.3, Oracle, Jan. 8, 1996.

Pro*COBOL Supplement to the Oracle Precompilers Guide, Release 1.8, Oracle, Feb. 1996.

SQL*Plus Quick Reference, Release 3.3, Oracle, 1986.

SQL*Plus User's Guide and Reference, Release 3.3, Oracle, 1986.

Getting Started with Oracle7 for UNIX, Release 7.3, Oracle, Jul. 1996.

Oracle7 Enterprise Backup Utility Error and Diagnostic Manual, Release 2.1, Oracle, Oct. 1996.

Oracle7 Spatial Data Option, User's Guide and Reference, Release 7.3.3, Part No. A48124–2, Oracle, Jun. 1997.

Oracle7Server Tuning, Release 7.3.3, Oracle, Oct. 31, 1996.

Oracle7 Server Utilities Manual, Release 7.2, Part No. A19485–2, Mar. 1995.

PowerMart Version 3.0, Administrator's Guide, Informatica, 1996.

PowerMart Version 3.0, Transformation Reference Guide, Informatica, 1996.

"Praxis Makes A Go At Perfect Replication", Network World, Sep. 25, 1995.

Natural ISPF User's Manual, Software AG, Nov. 1990.

Natural ISPF Concepts & Facilities, Software AG, Nov. 1990.

Predict Administrationshandbuch, Software AG, Nov. 1993.

Predict Concepts and Facilities, Software AG, Sep. 1990.

Sagent Data Mart—Administrator's Guide, Release 1.0 Beta 2, Sagent Technology, Inc., Sep. 12, 1996.

Information Studio Getting Started, Release 1.0 Beta 2, Sagent Technology, Inc., Sep. 16, 1996.

White, C., "Building a Corporate Information System: The Role of the Data Mart", Prepared for Sagent Technology, Inc., Feb. 1997.

Chatterjee, S., "Object Storing Diversifies", Advanced Systems, Jan. 1995.

"Smart's Loader Tool—Create Powerful Templates for Data Transformation & Migration", Nov. 17, 1996.

Anderson, G., Client/Server Database Design with Sybase, McGraw–Hill Series on Computer Communications, 1997.

Anderson, g., Client/Server Database Design with Sybase, McGraw–Hill Series on Computer Communications, 1997.

OmniSQL Server Installation Guide For SunOS Release 4.x, Nov. 1, 1993.

OmniSQL Server Server Class and Utilities Reference Manual, Release 10.0, Document ID: 36089–01–1010–01, Sybase Nov. 1, 1993.

OmniSQL Server System Administration Guide, Release 10.1, Document ID: 36086–01–1010–01, Sybase, Nov. 1, 1993.

OmniConnect Installation Guide for Digital UNIX, Release 10.5x, Document ID: 34378–01–1050–01, Sybase Aug. 15, 1995.

OmniConnect User's Guide, Sybase, Aug. 15, 1995.

Sybase Replication Server Technical Publications, Replication Server Administration Guide, Release 11.0x, Nov. 1, 1995.

Sybase Replication Server Technical Publications, Replication Server Commands Reference, 10.0, Feb. 1, 1994.

Sybase Replication Server Technical Publications, Replication Server Design Guide, Release 10.0, Oct. 21, 1993.

Sybase Replication Server Technical Publications, Replication Server Design Guide, Release 11.0, Nov. 1, 1995.

Sybase Replication Server Technical Publications, Republication Server Overview, Release 10.0, Oct. 20, 1993.

Clifford, C., Sybase Replication Server Primer, 1995.

Herzberg, P., "How SAS Works: A Comprehensive Introduction to the SAS System", Second Edition, Springer–Verlag/Captus Press, 1990.

SAS/Access: Interface to Sybase and SQL Server, Usage and Reference, Version 6, First Edition, SAS Institute, Inc., 1993.

SAS Guide to the SQL Procedure: Usage and Reference, Version 6, First Edition, SAS Institute, Inc., 1989.

SAS Language and Procedures: Usage, Version 6, First Edition, SAS Institute, Inc., 1989.

SAS Macro Language: Reference, First Edition, SAS Institute, Inc., 1997.

Aronson, et al, SAS System: A Programmer's Guide, J. Ranade IBM Series, 1990.

Janes, et al, "A Data Warehouse Using the SAS System", Information Systems, Proceedings of the 21st Annual SAS Users Group International Conf., Chicago, IL, Mar. 10–13, 1996.

SAS/Warehouse Administrator User's Guide, Release 1.1, First Edition, SAS Institute, Inc., Apr. 1997.

"Systemfabrik supplies the Warehouser's Workbench, the DataWarehouse/DataMart development environment for Windows, Mac, OS/2 and UNIX for CeBIT 1997 on time", Jan. 6, 1997.

Warehousers Workbench, User's Manual, Version 1.2, Mar. 11, 1997.

Stonebroker, et al, "Mariposa, A New Architecture for Distributed Data", Univ. of CA, Comp. Sci. Div. EECS Dept. Berkeley, CA, 1994.

Papakonstantinou, et al, "MedMaker: A Mediation System Based on Declarative Specifications", Stanford Univ., Computer Science Dept., Feb. 1996.

"The INTEGRITY Data Reengineering Environment, MVS User's Guide", Vality Technology Incorporated, 1992.

Wiener, et al, "A System Prototype for Warehouse View Maintenance", Stanford University, Dept. of Computer Science, Jun. 7, 1996.

Gupta, et al, "Aggregate Query Processing in Data Warehousing Environments", Proceedings of the 21st VLDB Conference, Zurich, Switzerland, 1995.

Gupta, A., "Integration of Information Systems: Bridging Heterogeneous Databases", IEEE Press, 1989.

User's Guide—PowerCenter 1.0, PowerMart 4.0, PowerMart Network Edition 4.0, Informatica Corporation, Jan. 1998.

Gieger, K., "Inside ODBC: Developer's Guide to the Industry Standard for Database Connectivity", Microsoft Press, 1995.

Microsoft ODBC 2.0 Programmer's Reference and SDK Guide, Correction Copy/Proof Copy, 1st Printing, 1992.

"Have you Reasd About These Exciting InfoPump Applications?", Trinzic, 1995.

"Microsoft Announces ActiveX Technologies", Microsoft Press Release dated Mar. 12, 1996 (http://www.microsoft.com/presspass/press/1996/mar96/activxpr.mspx).

Information Junction v. 1.7.3 Grab/Send Supplemental Guide, Constellar Corporation, 1997.

Information Junction v. 1.7.3 System Administrator's Guide, Constellar Corporation, 1997.

IBM Visual Warehouse, General Information, Release 2, Second Edition, Oct. 1995.

IBM Visual Warehouse, Getting Started, Release 2, First Edition, Oct. 1995.

IBM Visual Warehouse, Planning and Installation, Release 2, Second Edition, Oct. 1995.

"Passport release 5.5 provides metadata management," Software Magazine, Jul. 1, 1996.

"Tools & Techniques changes name to Data Junction Corporation," Business Wire, Nov. 25, 1996.

"Data Junction announces powerful 32-bit graphical data conversion tool," Business Wire, Feb. 25, 1997.

"DataStage Architecture Overview," 1996.

"DataStage™," Version 0.2, May 30, 1996.

"VMARK has Data Transformation Engine for Marts & Warehouses," Computer Business Review, Nov. 15, 1996.

"VMARK Software extends data warehousing's reach to unserved markets," Business Wire, Nov. 19, 1996. Also at http://web.archive.org/web/19971009060355/www.vmark.com/datastage/news1.

"VMARK Software Debuts DataStage™ at DB/Expo, Booth #13," Dec. 3, 1996, http://web.archive.org/web/19971009060338/www.vmark.com/datastage/dsdebut.htm.

"VMARK announces . . . DataStage product on Digital Equipment Corporation's Alpha NT platform . . . build Data Warehouses," Dec. 11, 1996, http://web.archive.org/web/19971009060322/www.vma.

"VMARK Software announces fourth quarter revenue and earnings expectations," Business Wire, Jan. 6, 1997.

"VMARK Software Ships DataStage," Business Wire, Jan. 20, 1997. Also at http://web.archive.org/web/19971009060257/www.vmark.com/datastage/shipping.htm.

"VMARK Software named Red Brick PaVER partner," Business Wire, Jan. 20, 1997.

"VMARK Software announces fourth quarter/year-end 1996 results," Business Wire, Jan. 23, 1997.

"VMARK Technical Publications Catalog," Jan. 1997, http://web.archive.org/web/19970719091550/http://www.v-mark.com/Services/Resources/TechBulletins/techbull/tpcat97.pdf.

"Feb. 1997 Product News," Database Programming and Design, Feb. 1997, http://www.dbpd.com/vault/feb-prod.htm.

"DataStage," Software Magazine, Feb. 1, 1997.

"VMARK Boosts DataStage Performance with High Speed Interfaces for Oracle, Sybase, and Microsoft SQL Server," Business Wire, Apr. 14, 1997.

"VMARK Software, Inc. Reports First Quarter 1997 EPS of 4 cents; Results Include Initial DataStage Shipments," Business Wire, Apr. 22, 1997.

"META Group Report, VMARK Software: DataStage," May 1, 1997, http://web.archive.org/web/19971009060831/www.vmark.com/datastage/metarep.html.

"VMARK Software's Vertical Warehouse Initiative delivers turnkey, application-centric, data warehouse solutions," Business Wire, May 12, 1997.

"VMARK Software taps Datacom Technology Group as New York area's first DataStage valued partner," Business Wire, Jun. 9, 1997.

"VMARK Software'DataStage gets high marks from Relational Solutions," Business Wire, Jun. 17, 1997.

Coburn, "An integrated architecture for distributed applications." In Proc. of the 1993 Conference of the Centre For Advanced Studies on Collaborative Research: Software Eng.

Okumura, K., "A formal protocol conversion method." In Proceedings of the ACM SIGCOMM Conference on Communications Architectures &Amp; Protocols 1986.

Shu, N. C., Housel, B. C., and Lum, V. Y. 1975. Convert: a high level translation definition language for data conversion. Commun. ACM 18, 10 (Oct. 1975), 557–567.

Shu, N. C., et al, Express: a data EXtraction, Processing, and Restructuring System. ACM Trans. Database Syst. 2, 2, Jun. 1977.

Auerbach, J., "A protocol conversion software toolkit", In Symposium Proceedings on Communications Architectures &Amp; Protocols 1989.

Housel, B. C. 1979. Pipelining: a technique for implementing data restructures. ACM Trans. Database Syst. 4, 4 (Dec. 1979), 470–492.

"Enterprise-Scalable Data Marts Shake up the Market; Informatica Corp. Ships Powermart Suite," PR Newswire, May 20, 1996.

"PowerMart suite overview," Nov. 26, 1996, http://web.archive.org/web/19970410070715/www.informatica.com/power.pdf.

"Adhikari, Richard, "Migrating legacydata: how to get there from here," Software Magazine, Jan. 1, 1996."

Kimball, Ralph, "Automating Data Extraction," DBMS, Jul. 1996. Retrieved from http://www.dbmsmag.com/9607d05.html.

Orli, Richard J., "Data Extraction, Transformation, and Migration Tools," Part 2, http://www.kismeta.com/ex2.html.

Williams, Joseph, "Tools for Traveling Data," DBMS, Jun. 1997. Retrieved from http://www.dbmsmag.com/9706d16.html.

Brooks, Peter, "March of the Data Marts," DBMS, Mar. 1997. Retrieved from http://www.dbmsmag.com/9703d14.html (Clink currently invalid).

Chaudhuri, S. and Dayal, U. 1997. An overview of data warehousing and OLAP technology, SIGMOD Rec. 26, 1 (Mar. 1997), 65–74. DOI= http://doi.acm.org/10.1145/248603.248616.

"Platinum technology, inc. continues to deliver on data warehouse vision—announces new versions of six products . . . ", Business Wire, Feb. 6, 1996.

"Platinum technology, inc. Introduces InfoPump 2.0; Expands operating system support to HPUX and Sun Solaris; Adds additional DBMS interfaces," Feb. 6, 1996.

"Platinum technology ships InfoPump 2.2; . . . UNIX platforms and supports Lotus Notes 4.0; tool enables data movement across the broadest range . . . "Business Wire Apr. 16, 1996.

"Platinum InfoPump," http://web.archive.org/web/19970208070335/www.platinum.com/products/dataw/in-pumps.htm.

"Platinum technology, inc. delivers on Data Warehouse Vision . . . ; Company's powerful solution strengthened with addition of new data movement . . . " Business Wire, Oct. 19, 1995.

Platinum technology, inc. continues to deliver on data warehouse vision . . . six products; Company continues integration of . . . end data warehouse solution, Business Wire Feb. 6, 1996.

Platinum technology Ships New Versions of InfoTransport and InfoRefiner . . . ; Advanced data movement products provide tighter integration, Business Wire Feb. 6, 1996.

"Platinum InfoRefiner," http://web.archive.org/web/19970208070344/www.platinum.com/products/dataw/in-ref_ps.htm, Feb. 8, 1997.

"Prism Solutions' Next–Generation Software Enables Rapod Design, Construction and Management of Data Warehouses and Marts," Business Wire, Nov. 26, 1996.

Eckerson, Wayne W., "Data Mart Competitors Team Up," The Pulse from Patricia Seybold Group's Business Intelligence & Data Warehouse Service, Mar. 12, 1997.

"META Group Profiles Prism Solutions in Data Warehousing Tools Bulletin." http://web.archive.org/web/19970630063152/www.prismsolutions.com/news_info/newsroom_events/meta.html.

Prism Warehouse Executive Demo, Feb. 3, 1997 (Compact Disc). At http://web.archive.org/web/19970205135707/http://www.prismsolutions.com/prod_solu/dw_solu/prismpwe.zip.

Prism Warehouse Manager 4.4 Increases Development Productivity, Supports New Platforms . . . Data Warehousing; Now Supports Windows 95 and NT, DB2 Parallel Edition, Jun. 11, 1996.

Reliant Announces Venture Capital Funding; Appointment Of New Executive VP Of Sales And Marketing; Data Migration Pioneer Secures $2.25 Million Funding . . . Jul. 23, 1996.

"Reliant Data Systems Announces World's First True Codeless Data Migration Software; Breakthrough Tool Reduces Data Migration Costs By 90% . . . " Business Wire, Jul. 23, 1996.

"New tools speed data conversion from legacy to client/server apps," Network World, Feb. 24, 1997, http://findarticles.com/p/articles/mi_qa3649/is_199702/ai_n8749868/print.

Sagent delivers Version 2 Data Mart Solution with interactive desktop and web–based analysis tools; Innovative OLAP Architecture first to combine . . . , Business Wire Apr. 28, 1997.

Shumate, John, "Sagent Offers One–Stop Data Shopping; Data Mart Solution 2.0 ably meets data management, analysis, extraction needs," PC Week, May 12, 1997.

"Sagent™ Data Mart Solution Ships; Customers and Industry Experts Laud Sagent's Product and Market Strategy," Oct. 21, 1996.

"Your Data Mart Solution For Windows NT," Oct. 8, 1996, http://web.archive.org/web/19970107053757/www.sagent-tech.com/product.htm.

Liu, et al, "An Adaptive Object–Oriented Approach to Integration and Access of Heterogeneous Information Sources", Apr. 1997.

Liu, et al, "A Record Oriented, Grammar Driven Data Translation Model", 1974.

Capsule User's Guide: Release 2.0 of the Data Interpretation System, Metaphor, Jun. 1994.

Archived web pages from Sagenttech.com—Sagent Technology Unveils Industry's First Integrated Data Mart Solution for Microsoft Windows NT, Aug. 5, 1996.

Eckerson, W., "Data Conversion Engines, Second–Generation Conversion Tools Hit the Market", Patricia Seybold Group's Open Information Systems, vol. 11, No. 12, Dec. 1996.

Housel, B. C. and Shu, N. C. 1976. A high–level data manipulation language for hierarchical data structures. In Proceedings of the 1976 Conference on Data, Mar. 24, 1976.

Bright, et al, "Automated Resolution of Semantic Heterogeneity in Multidatabases", ACM Transactions on Database System, vol. 19, No. 2, Jun. 1994, pp. 212–253.

Kathy Bohn, "Converting Data for Warehouses", Jun. 1997.

Wingfield, N., "Vitria Debuts Smart Pull Server", CNET News, Jun. 9, 1997.

"Model–Driven Application & Integration Components for MES", Technologies for the Integration of Manufacturing Applications (TIMA), Jan. 1996.

Java–Powered Middleware Helps Applications Communicate. (Java–Powered Rendezvous) (Brief Article) (Product Announcement), Software Magazine, Oct. 1, 1996.

"TIBCO Named by IDC as Largest Message–Oriented Middleware Vendor; . . . Expected to Reach $5.9 Billion by the Year 2000 According to IDC Study", Business Wire, Sep. 17, 1996.

"TIBCO Announces Java–Powered Rendezvous Software; TIBCO's Publish–Subscribe . . . Developers Create Scalable, Real Time Java–Powered Applications", Business Wire, May 30, 1996.

"TIBCO Ships TIB/Rendezvous 3.0; New Messaging Software Provides Foundation for Push Computing; . . . Microsoft ActiveX and Sun Microsystems Java", Business Wire, Mar. 31, 1997.

TIBCO's New WebWay Gateway Connects TIB–Enables Enterprises to World Wide Web; Supports New Class of Services in C++ . . . CGI Programming, Business Wire, Oct. 24, 1996.

Hibbert, H., "Data Conversions from Legacy Systems to Oracle RDBMS Using The Smart DB Workbench", CODA 1995 Conference Proceedings.

"Trillium Software Joins NCR's Scalable Data Warehouse Strategic Alliance", PR Newswire, Oct. 14, 1996.

HighBeam Research; Article from Business Wire; Oct. 17, 1995; SmithKline Beecham Selects Frontec to Supply Strategic Messaging Backbone; Advanced Messaging Technology to be Core Component of Global Intercompany Messaging System; 2 Pgs.

HighBeam Research; Article from Business Wire; Jan. 23, 1996; Frontec Acquires Assets of Operations Technologies; Applications Messaging Leader to Provide Intelligent Messaging Solutions; 2 Pgs.

HighBeam Research; Article from Business Wire; Mar. 5, 1996; Frontec and Manugistics Form Strategic Partnership; Leading Transportation Planning System Enhanced; Incorporates Advanced Intelligent Messaging Applications 2 Pgs.

HighBeam Research; Article from Business Wire; Sep. 17, 1996; Frontec Launches Intelligent Messaging Solutions Worldwide; 2 Pgs.

HighBeam Research; Article from Business Wire; Mar. 21, 1997; Frontec and Stratus Computer Form Strategic Marketing Alliance; 2 Pgs.

HighBeam Research; Article from Business Wire; Feb. 4, 1997; Frontec Introduces Latest Messaging Technology for Electronic Intelligent Messaging and a New Internet Product; 2 Pgs.

HighBeam Research; Article from Business Wire; Mar. 18, 1997; Frontec Introduces New Intelligent Messaging Capability; 2 Pgs.

Article, AMTrix—Application Messaging Technology; 9 Pgs.; webmaster@5th.frontec.se; Copyright 1996—Frontec AB; Date Printed from Web: Dec. 11, 2009.

Article—NeXT Software, Inc., © 1993–96 Webobjects—Enterprise Web Solutions; 2 Pgs.

Article, Neumann, D.; MacTech, vol. 13 (1997), Issue No. 5, Column Tag: OPENSTEP; An Introduction to Webobjects; 9 Pgs.

Encyclopedia.com; Article from Business Wire; Jun. 25, 1996; NeXT Software Ships Version 2.0 of WebObjects Product Line; WebObjects Builder Provides Rapid Drag and Drop Web Application Assembly with Minimal Coding; 2 Pgs.

Printout—© Tristin Louis, 2009; NeXT Shows Off its WebObjects; pp. 1–3.

Article—Jobs After Apple: To NeXT and Beyond; A Sample from Apple Confidential © 1999 Owen W. Linzmayer (OWL@Bigfoot.com); pp. 167–178.

Printout—Getting Started with Webobjects; Chapters 1–3; 120 Pgs.; 1997.

Printout—Direct to Web; Chapter 1; 34 Pgs.; 1997.

HighBeam Research; Article from Software Magazine; Oct. 1, 1996; Java–Powered Middleware Helps Applications Communicate (Java–Powered Rendezvous) (Brief Article) (Product Announcement); 1 Pg.

HighBeam Research; Article from Business Wire; Sep. 17, 1996; TIBCO Named by IDC as Largest Message–Oriented Middleware Vendor; Worldwide Middleware Market Expected to Reach $5.9 Billion by the Year 2000 According to IDC Study.; 2 Pgs.

HighBeam Research; Article from Business Wire; Mar. 31, 1997; TIBCO Ships TIB/Rendezvous 3.0; New Messaging Software Provides Foundation for Push Computing; Product Supports Seamless Integration of Microsoft ActiveX and Sun Microsystems Java.; 3 Pgs.

Article—Smart's Query Tool, Last Modified Nov. 17, 1996; Copyright 1996 Smart Corporation; webmaster@smartdb.com; 2 Pgs.

Melton, J., et al., *Understanding The New SQL: A Complete Guide,* Morgan Kaufman, Chapters 1–3, 6, 8, 9, and Appendix G, 1993.

Trinzic Corp., *The InfoPump Script Language Guide,* published 1993.

Channel Computing, Inc., *The InfoPump Installation and Server Guide,* 1993.

Channel Computing, Inc., *The InfoPump Manager Guide,* 1993.

Morgenstern, M., *An Integration Platform for Heterogeneous Databases: The DAISy System,* Xerox Design Research Institute, © 1996.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-12 and 14-19 is confirmed.

Claim 13 is cancelled.

* * * * *

(12) EX PARTE REEXAMINATION CERTIFICATE (9682nd)
United States Patent
Ellis et al.

(10) Number: US 6,195,662 C2
(45) Certificate Issued: May 29, 2013

(54) SYSTEM FOR TRANSFORMING AND EXCHANGING DATA BETWEEN DISTRIBUTED HETEROGENEOUS COMPUTER SYSTEMS

(75) Inventors: Darin Ellis, Orleans (CA); Michael Doyle, Gloucester (CA)

(73) Assignee: Juxtacomm Technologies Inc., Calgary (CA)

Reexamination Request:
No. 90/011,267, Oct. 6, 2010

Reexamination Certificate for:
Patent No.: 6,195,662
Issued: Feb. 27, 2001
Appl. No.: 09/105,299
Filed: Jun. 26, 1998

Reexamination Certificate C1 6,195,662 issued Jul. 27, 2010

Certificate of Correction issued Apr. 19, 2011

Related U.S. Application Data

(60) Provisional application No. 60/051,052, filed on Jun. 27, 1997.

(51) Int. Cl.
*G06F 17/22* (2006.01)

(52) U.S. Cl.
USPC .................................. 707/737; 707/999.001; 707/999.002; 707/999.008; 707/999.01; 707/999.102; 707/999.103

(58) Field of Classification Search
None
See application file for complete search history.

(56) References Cited

To view the complete listing of prior art documents cited during the proceeding for Reexamination Control Number 90/011,267, please refer to the USPTO's public Patent Application Information Retrieval (PAIR) system under the Display References tab.

*Primary Examiner* — Mary Steelman

(57) ABSTRACT

A system and method is described for importing data from a source computer system, manipulating and transforming of that data, and exporting the data to a target computer system under control of a script processor using stored metadata definitions. Metadata is used to describe the properties of the data being manipulated. The system includes a means for manipulating the metadata definitions. The metadata definitions are created to import data into the system, export data from the system, create views of the external data, store generic format data within the system, manipulate generic format data within the system and to control data flow through the system. Data is imported into the system using an import data definition to map the external data into an import data bag. Data imported into an import data bag becomes independent of the original data source. Data is manipulated within the system using script control commands and data is transformed within the system using rule sets that act upon data bags. Data is exported from the system using an export data definition to map the import data bag into required export data bag format and then to write data in the export data bag to the external data target.

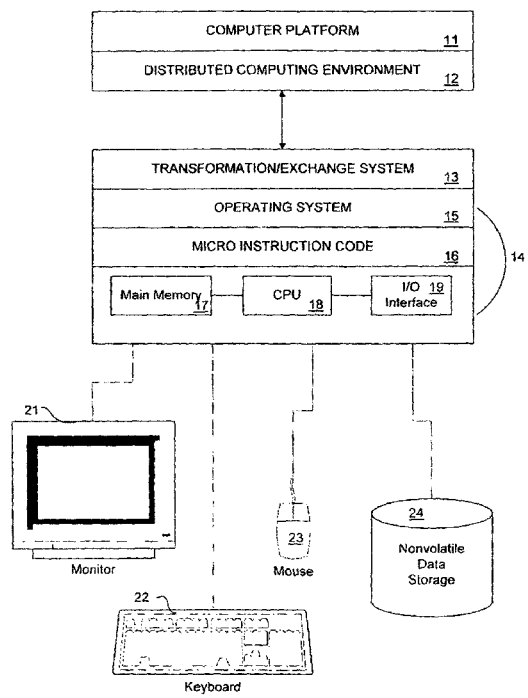

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-11 and 14-19 is confirmed.

Claim 13 was previously cancelled.

Claim 12 was not reexamined.

* * * * *